United States Patent [19]

Amend et al.

[11] 3,914,707

[45] Oct. 21, 1975

[54] SYSTEM FOR SYNCHRONIZING A FREELY OSCILLATING OSCILLATOR TO A REFERENCE OSCILLATION

[75] Inventors: Wilhelm Amend, Baierbrunn, Buchenhain; Toma Sotirović, Munich, both of Germany

[73] Assignee: Siemens Aktiengesellschaft, Germany

[22] Filed: July 16, 1974

[21] Appl. No.: 488,985

[30] Foreign Application Priority Data

July 16, 1973 Germany ........................... 2336140

[52] U.S. Cl. ......................... 331/4; 331/8; 331/17; 331/26

[51] Int. Cl.² ......................................... H03B 3/04

[58] Field of Search .................. 331/4, 8, 17, 25, 26

[56] References Cited

UNITED STATES PATENTS

| | | | |
|---|---|---|---|
| 2,956,239 | 10/1960 | Hugenholtz et al. | 331/4 |
| 2,972,720 | 2/1961 | Hume | 331/4 |
| 3,559,092 | 1/1971 | Roth | 331/18 X |

*Primary Examiner*—Siegfried H. Grimm
*Attorney, Agent, or Firm*—Hill, Gross, Simpson, Van Santen, Steadman, Chiara & Simpson

[57] ABSTRACT

A system for synchronizing a freely-oscillating signal to a reference oscillator which generates a subharmonic of the final desired frequency, wherein the free running oscillator has its output coupled to a phase discriminator and the reference oscillator is also supplied to the phase discriminator after conversion into pulses, with the output of the phase discriminator being coupled to an amplifier and hence to a control terminal of the free running oscillator for locking that oscillator to the desired frequency.

6 Claims, 11 Drawing Figures

SYSTEM FOR SYNCHRONIZING A FREELY OSCILLATING OSCILLATOR TO A REFERENCE OSCILLATION

BACKGROUND OF THE INVENTION

An article in the "Proceedings of the IRE", November, 1956, pages 1580 through 1594, described a system where pulses of the reference oscillator are added to the free running oscillator in a phase discriminator. If the frequency of the oscillator deviates from the harmonic of the reference oscillator, a beat frequency is produced. If a phase displacement is indicated, an increase or decrease in the output voltage is produced depending on the phase displacement.

The present invention is a result of an attempt to provide a circuit which is simplified with respect to this state of the art and which is more effective, and also which permits easier capture of the freely-oscillating signal.

FIELD OF THE INVENTION

The field of art to which this invention pertains is locked oscillators and in particular to locked oscillators having means to expand the capture range when there is a lack of synchronization.

SUMMARY OF THE INVENTION

It is an important feature of the present invention to provide an improved locked oscillator.

It is another feature of the present invention to provide a locked oscillator with improved capture range.

It is an object of the present invention to provide a locked oscillator using a discriminator which is controlled by pulses from a reference oscillator.

It is also an object of the present invention to provide a locked oscillator as described above, wherein an amplifier is used to supply the control voltage to the free running oscillator to control the same and wherein the amplifier is designed to produce a low frequency oscillation when a discriminator indicates a lack of synchronization between the reference oscillator and the free-running oscillator.

These and other objects, features and advantages of the present invention will be understood in greater detail from the associated drawings wherein reference numerals are utilized to designate a preferred embodiment.

DESCRIPTION OF THE PREFERRED EMBODIMENT

The present invention relates to a locked oscillator having means to increase the capture range of the free-running oscillator portion of the locked oscillator system, wherein the reference oscillations are supplied by a sub-harmonic generator and are converted into pulses which in turn control the switching of a discriminator. The discriminator in turn supplies a variable direct voltage to an amplifier for eventually adjusting the frequency of the oscillator being controlled.

Specifically, the circuit of the present invention is such that the phase discriminator described herein is utilized as a switch which is controlled by individual pulses generated from the reference oscillator. These pulses switch the oscillations of the free-running oscillator to the output of the phase discriminator for approximately the duration of half a time period of that signal.

Due to this kind of phase comparison, a positive or negative direct voltage component is produced directly at the output of the phase discriminator, depending upon whether the center of the individual pulses are positioned to the right or to the left of the zero cross-over point of the oscillation which is being synchronized.

Furthermore, in this type of circuit a device for broadening the capture area is provided which includes an amplifier having a regenerative feedback circuit which has its elements dimensioned in such a way that the amplifier carries out a damped oscillation upon receiving a signal from the phase discriminator which indicates a lack of synchronization.

The elements chosen in the feedback loop of the amplifier are selected in such a way that the frequency of oscillation is chosen in such a range that results in the phase noise contribution of the reference oscillator which is no greater than the contribution of the freely-running oscillator.

Figure 1:
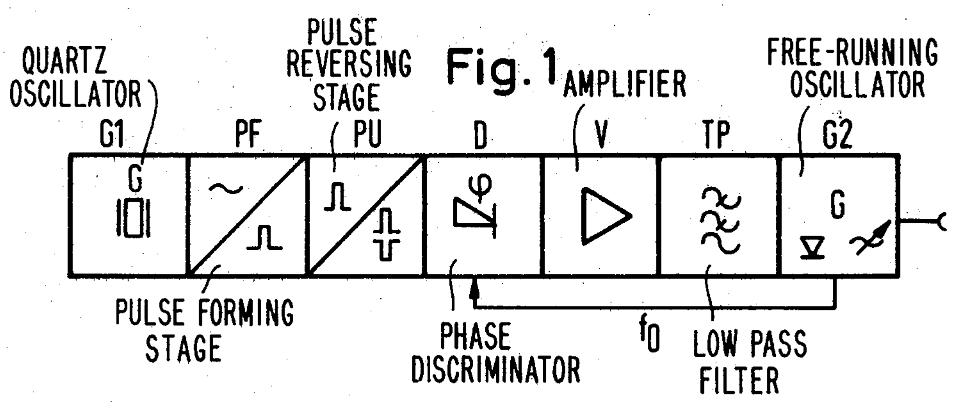
FIG. 1 shows a block circuit diagram of the synchronizing system of the present invention.

Referring more specifically to the drawings, the free-running oscillator in FIG. 1 is identified by reference numeral G2 as a tuning or adjusting member which may take the form of a capacitance diode whose bias is formed by the adjusting voltage developed at the output of the phase discriminator D and supplied thereto through the amplifier V.

The generator G2 oscillates at a high frequency, for example, 700 mHz., and is directly phase synchronized to a quartz frequency which is much lower. The quartz oscillator G1 emits a frequency *f*q which may be in the order of 90 mHz.

These oscillations are converted into pulses in the pulse forming stage PF and their pulse duration corresponds approximately to the width of half a wave of the oscillation *fo* emitted by the oscillator G2. Since opposite timing pulses are required for the phase discriminator D, which in this case takes the form of a bridge circuit, a pulse reversing stage PU is provided. Also, the phase discriminator D is supplied with oscillations of the generator G2. A direct voltage is obtained by the comparison of the two oscillations and is supplied from the amplifier V via a low-pass filter TP to the final adjusting device of the generator G2.

Figure 2:
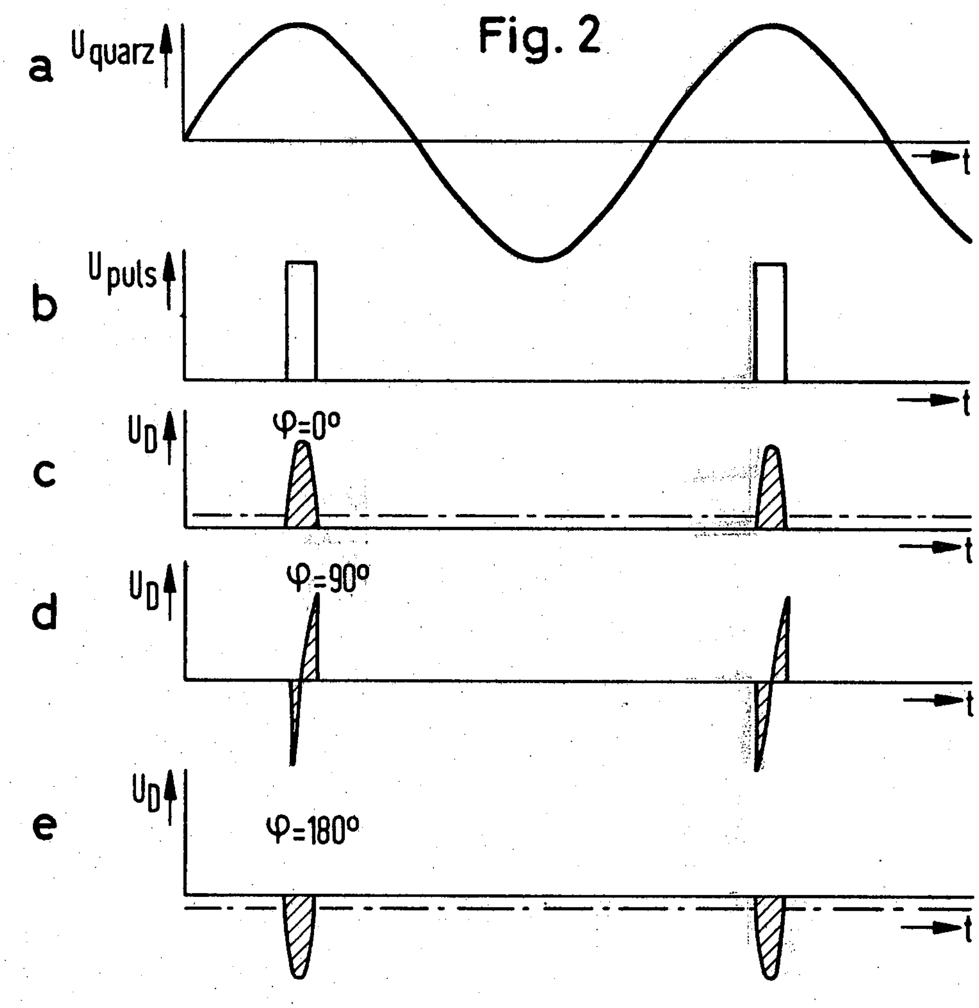
FIGS. 2*a*–2*e* shows a pulse scheme for explaining the function of the circuit of FIG. 1.

In reference to FIG. 2, line a shows the path of the output voltage of the quartz oscillator G1 having a frequency *fq*. A short pulse is taken from this oscillation and is shown in line *b*. One of the half waves of the high-frequency oscillation from the generator G2 is shown in lines *c* and *e* and arrives at the discriminator simultaneously with the impulse shown in line *b*. Since the discriminator D is effectively like a switch, this half-wave is connected to the output of the discriminator.

Since in the above case the phrase displacement between the pulse *b* and the half-wave at line *c* is zero, a positive control voltage $U_d$ appears at the output of the discriminator D. In the line *d* the two oscillations have a phase shift of 90°. And in this case the control voltage $U_d$ equals 0. The next line *e* goes to the opposite case where there is a 180° phase shift which results in a negative control voltage.

Accordingly, oppositely directed voltages will appear at the output of the phase discriminator depending upon whether the phase displacement between the respective pulses is positive or negative.

Figure 3:
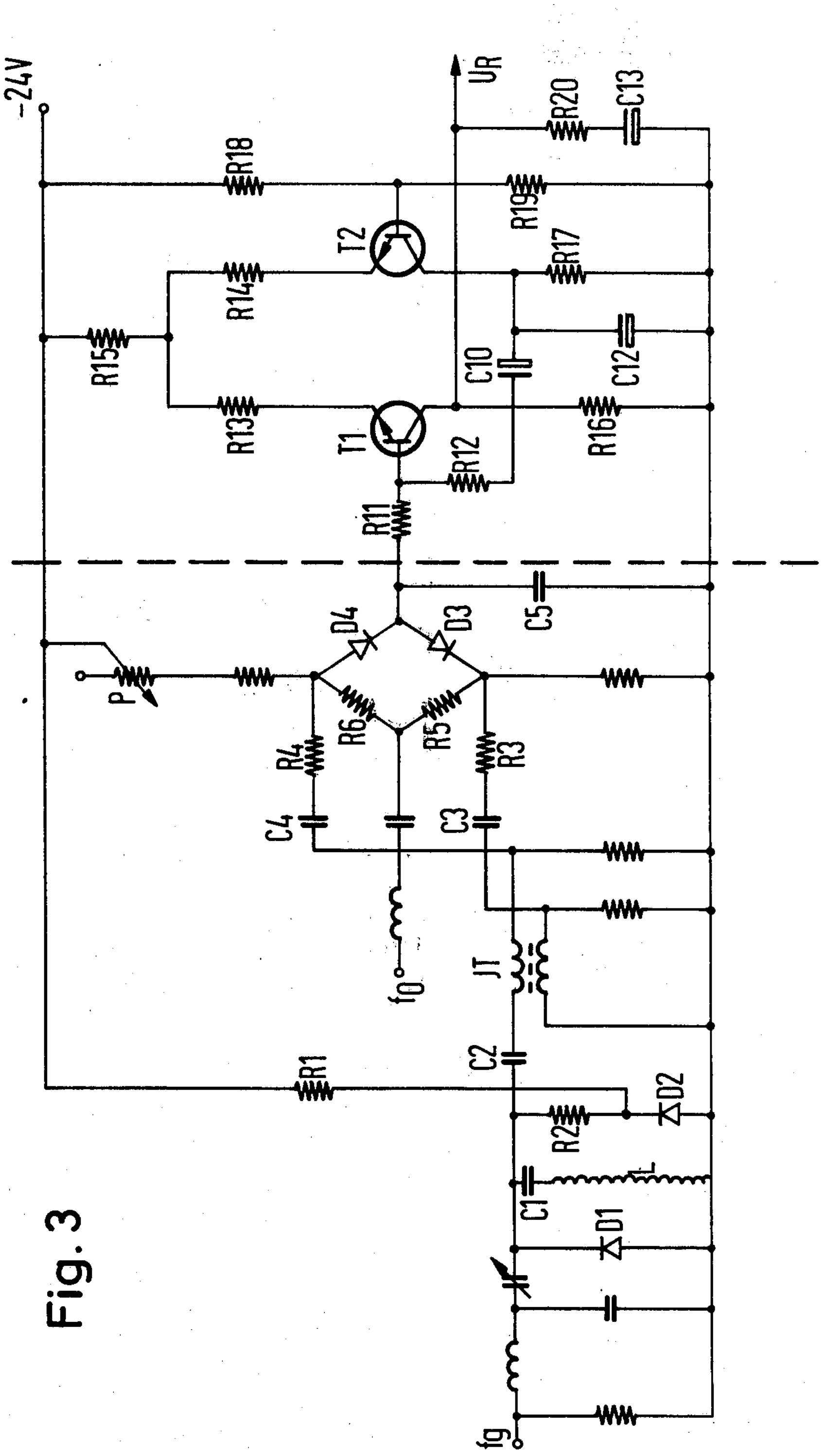
FIG. 3 shows the circuit diagram of the majority of the elements shown in FIG. 1.

FIG. 3 shows a circuit which contains the portions of the block diagram of FIG. 1 with the exception of the portions identified G1 and G2. In particular, the output signal *fq* of the quartz oscillator G1 appears at the input of the system. This oscillation reaches a diode D1. This diode is slightly biased forward by means of resistances R1, Zener diode D2, and resistor R2. The charge is stored during the negative half cycle of *fq*. This current is shown as a broken line in FIG. 4*a*. The current flows in an opposite direction in the positive half cycle whereupon the charge is removed from the diode. While current is flowing, the voltage at the diode remains fixed. However, when the entire charge is removed, the current goes to 0 in the time $t_t$, and the voltage at the diode assumes the value given by the signal *fq*.

Figure 4:
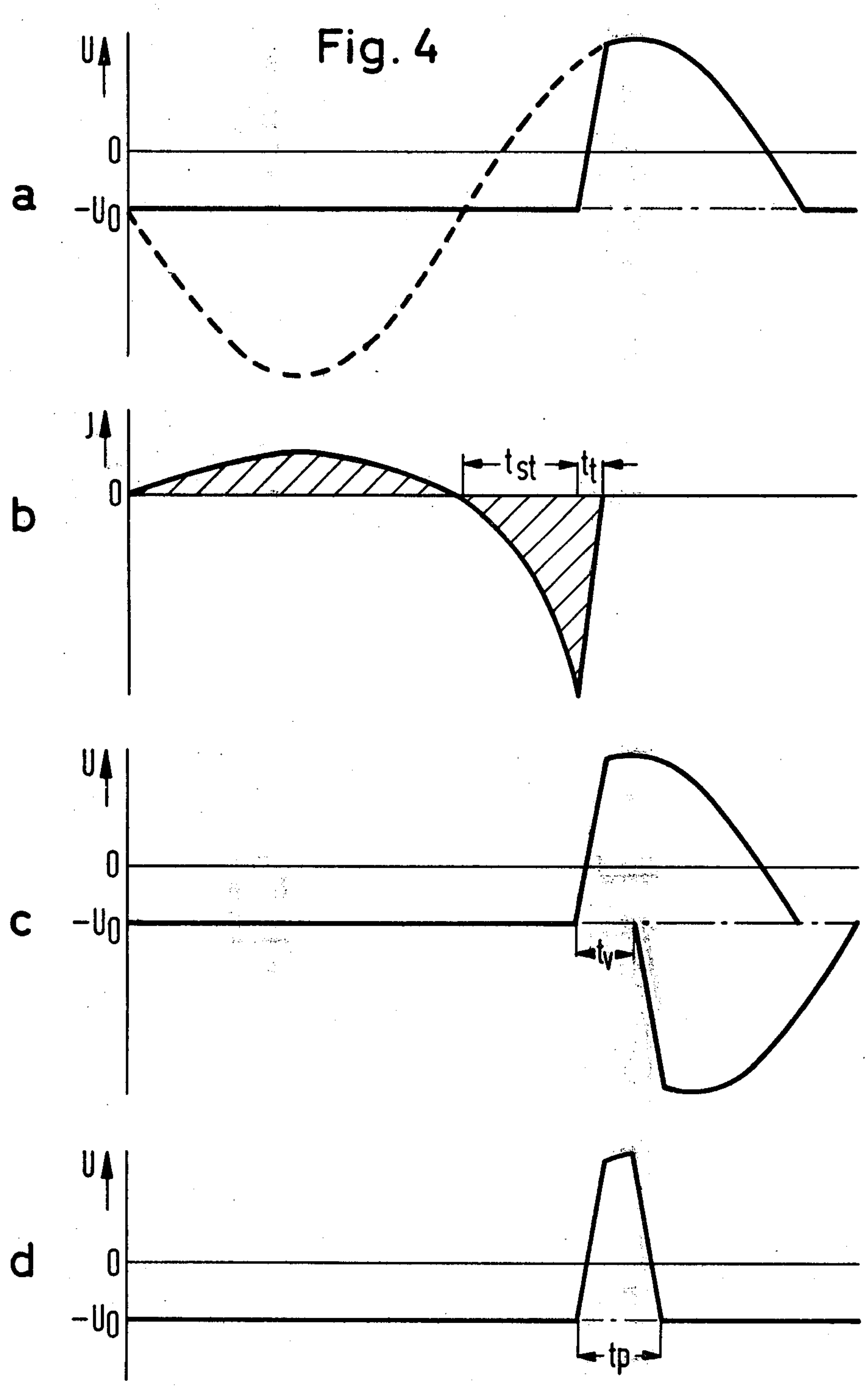
FIGS. 4*a*–4*d* show a pulse illustration for explaining the function of the pulse generator.

The voltage U at the diode thus has the path which is shown by the solid line in FIG. 4*a*. The increase in current and voltage is delayed with respect to the initiation of the positive half wave by a time interval $t_{sp}$. The associated current path is shown in line *d* of FIG. 4.

The wave produced in this manner has a steep flank shown in the upper curve of FIG. 4*c* which travels into a delay line L which is short-circuited at its end. The voltage is reflected at the end and returns to the mentioned diode with a phase reversal of 180° which is superimposed upon the first-mentioned wave. This return wave is shown in the lower portion of FIG. 4*c*. During this time interval $t_v$, a pulse is produced having a width $tp$ and it is supplied by the capacitor C2 to an impulse transformer JT. Since the subsequent phase discriminator, which is embodied as a switch, must operate entirely symmetrically, the impulse transformer is to produce an equally large, but oppositely directioned impulse in its secondary winding. The two equal impulses which, however, are 180° out of phase reach the phase bridge itself via the capacitors C3, C4 of equal values and via the resistors R3, R4. This phase bridge essentially consists of two fast-switching diodes D3 and D4. The diodes are direct-voltage biased in the block barrier direction. Together with the two equally large resistances R5 and R6, they form a symmetric bridge circuit. This symmetry is required in order to obtain a good decoupling between the high-frequency oscillator G2 and the quartz frequency oscillator G1.

The phase discriminator is switched on by the arriving impulses from the impulse transformer for the duration of the half waves of the high-frequency oscillator G2. The frequency of supplies a small voltage to the output of the phase discriminator which represents the phase difference between the two oscillators in accordance with magnitude and direction. A small capacitance C5 is provided at the output of the phase bridge. The bias of the phase discriminator is adjusted by the potentionmeter P in such a way that the switching on of the phase discriminator is only effected by the pulses as described.

The control voltage appearing at the output of the phase bridge might now be directly supplied to the frequency adjusting device of the freely-running oscillator G2.

Since, however, it is always required to provide a system, which, when the entire arrangement is switched on or, in the case of a lack of synchronization, brings the oscillator G2 into the proximity of the upper wave of the quartz oscillator frequency, a so-called capture system is provided. It consists of an amplifier V which simultaneously supplies a control voltage in an advantageously simple manner. This amplifier usually transmits the subsequent adjusting voltage, which changes slowly and which appears at the output of the phase bridge. The adjusting voltage is caused to oscillate by way of a regenerative feedback circuit. The feedback circuit impedance consists of a capacitance C10 in series with a resistance R12 and is dimensioned in such a way that the amplifier carries out a low frequency oscillation for a short time when a voltage reaches its imput. Such a voltage input always occurs when the oscillator suddenly is out of step of when a frequency displacement exists when the system is initially activated.

Specifically, the dimensioning of this regenerative feedback is carried out such that the amplifier carries out an oscillation, in the sample embodiment of one Hz. In order to fulfill the regenerative feedback conditions the amplifier is in two stages using the two transistors T1 and T2.

A differential amplifier is particularly advantageous, as it is shown in FIG. 3, since in this case the adjusting voltage which is taken from the collector resistance R16 of the transistor T1 is in an order of magnitude which is within the operational range of the capacity-variation diodes of the generator G2. Such diodes, as it is known, are usually used as subsequent adjusting elements for oscillators. The operational point is essentially fixed by the resistors R13, R14, R15, the cellector resistors R16 and R17 and the resistors R18, R19 for adjusting the base bias of the transistor T2. The subsequent control voltage is taken from the collector of the transistor T1 and is isolated from alternating voltages by the capacitance C13. In order to facilitate the capture process, it is advantageous to maintain the speed of the frequency change approximately constant during the oscillation of the amplifier in the entire searching range. For this reason, a capacitor C12 is connected parallel to the collector resistance of the transistor T2 and has a high time constant.

The resistance R20 is connected in series with the capacitor C13. The ac path is also influenced by the sensitivity of the discriminator, the amplification of the amplifier V and the properties of the subsequent tuning diodes.

The resister R11 at the input E of the circuit serves to decouple the discriminator. In the preferred embodiment, the following values of the elements have been used:

| | | |
|---|---|---|
| R15 = 4,7K; | R13 = 100 Ω; | R14 =100 Ω |
| R18 = 3,9K; | R11 = 100 Ω; | R12 = 20K; |
| C10 = 2 μF; | R19 = 12K; | R20 = 160 $R_1$; |
| R16 = 20K; | R17 = 20K; | C12 = 22 μF; |
| | C13 = 330nF. | |

In this circuit the oscillator was stabilized at approximately 700 mHz.

If, during the switching-on of this circuit, the freely-running oscillator is adjusted in such a way that its frequency is positioned in the holding range, the amplifiers T1 and T2 will oscillate once. The differential frequency becomes smaller fast when synchronization is approached, which causes the effectiveness of the alternate-voltage regenerative feedback circuit to decrease. If the frequency of the freely-running oscillator is so far remote from the desired frequency that the phase control cannot capture, an oscillation of 1 Hz occurs at the control voltage conductor which, among other things, can be used as an indicator for non-synchronization.

The invention claimed is:

1. The combination of a free-running oscillator having a control input for frequency adjustment, a reference oscillator, a discriminator for comparing the phase of the free-running oscillator to the phase of the reference oscillator, an amplifier coupled to an output of the discriminator and supplying a control signal to the control input of the free-running oscillator for locking said oscillator to said reference oscillator, means for developing pulses from the reference oscillator frequency and said discriminator comprising switch means controlled by said pulses for switching the free-running oscillator output signal for approximately one half of its time period and for producing a positive or negative d.c.-signal output depending upon the phase difference between said pulses and said free-running oscillator output frequency and wherein said amplifier has a regenerative ac feedback circuit having its parameters chosen to develop a damped oscillation after said amplifier receives a signal from said discriminator indicating a lack of synchronization between said two oscillators and wherein said amplifier has two transistor stages in a common emitter configuration and wherein the collector resistances are relatively higher than the emitter resistances and wherein the control signal for the free-running oscillator is taken from the collector of the first transistor stage and wherein the ac feedback circuit is a series resistance-capacitance branch connected from the output of the second stage to the input of the first stage.

2. The combination of claim 1 wherein the frequency of the regenerative feedback circuit of the amplifier is chosen to be of such magnitude that the phase noise contribution of the reference oscillator to the output of the free-running oscillator is not greater than that of the free-running oscillator, itself.

3. The combination of claim 2 wherein a resistance and series capacitance are connected in shunt with the control output of said amplifier and wherein the magnitude of this resistance is chosen to minimize the phase noise of the oscillator.

4. The combination of claim 1 wherein the time constant of said series resistance-capacitance branch is chosen to produce damped oscillations of approximately 1 Hz.

5. A circuit in accordance with claim 1 wherein said means for developing pulses from the reference oscillator frequency comprises:

a step recovery diode, means for applying the reference oscillator frequency to said step recovery diode, a breakdown diode $D_2$ in a parallel branch to said step recovery diode, means for biasing said step recovery diode in its flow direction, and a series LC branch connected in parallel to said step recovery diode.

6. A circuit in accordance with claim 5 wherein said phase discriminator includes a phase bridge having a pair of symmetry inputs, a blocking capacitor, a pulse transformer; the output of said step recovery diode being coupled through said blocking capacitor to the input of the pulse transformer and the output of the transformer being coupled to said symmetry inputs of said phase bridge, said transformer being coupled to supply said bridge with equal but out of phase pulses.

* * * * *